Figure 2:
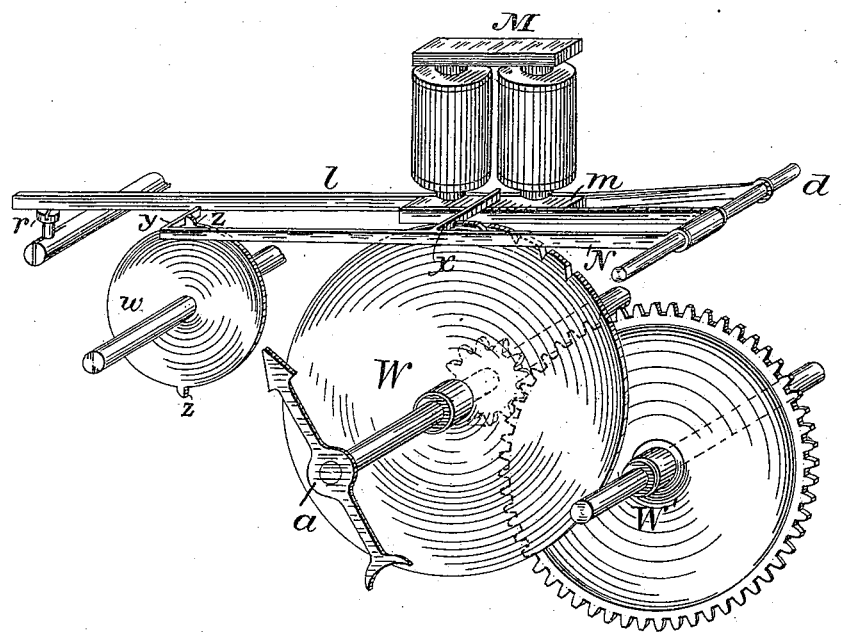

(No Model.) 2 Sheets—Sheet 1.
E. T. GILLILAND.
AUTOMATIC CIRCUIT CHANGER.
No. 334,014. Patented Jan. 12, 1886.
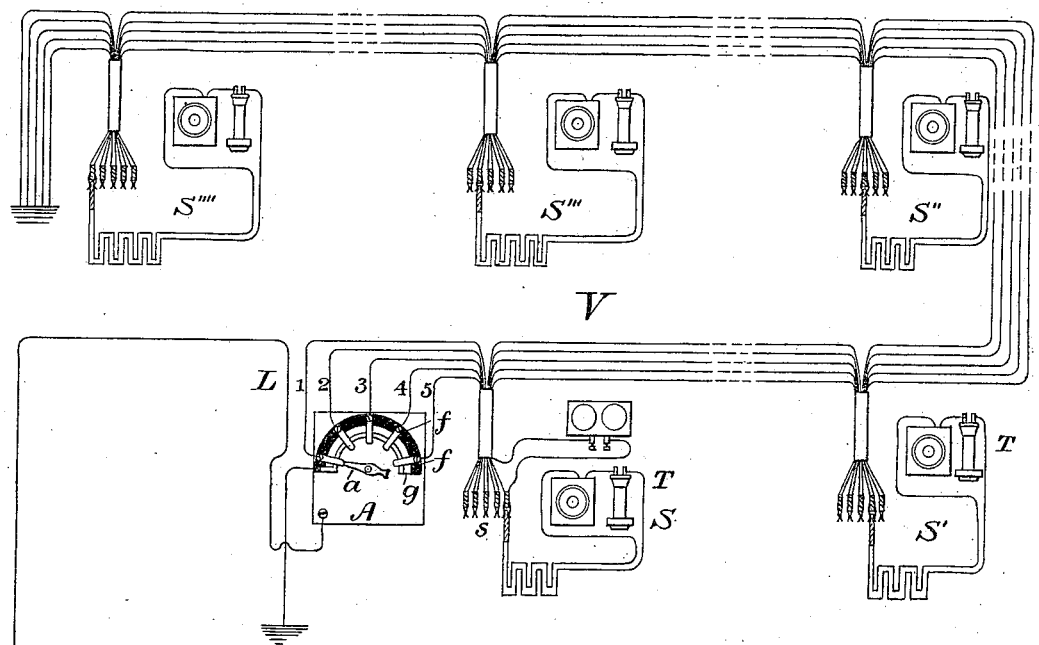
Fig. 1.
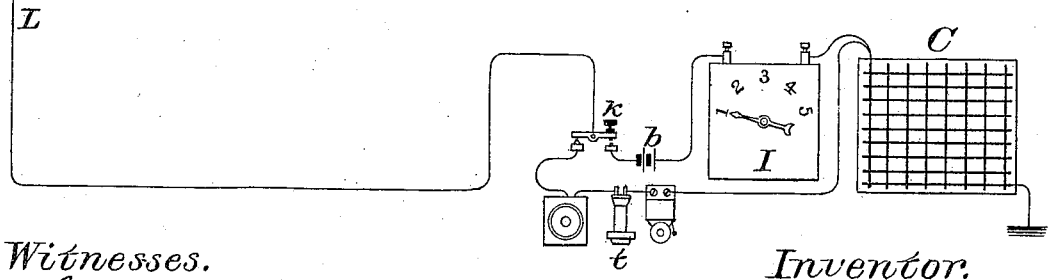
Witnesses.
Geo. Willis Pierce,
Wm. A. Vansize
Inventor.
Ezra T. Gilliland (No Model.) 2 Sheets—Sheet 2.

E. T. GILLILAND.
AUTOMATIC CIRCUIT CHANGER.

No. 334,014. Patented Jan. 12, 1886.

Witnesses.
Geo. Willis Pierce
Wm. O. Vansize

Inventor:
Ezra T. Gilliland

UNITED STATES PATENT OFFICE.

EZRA T. GILLILAND, OF BOSTON, MASSACHUSETTS, ASSIGNOR TO THE AMERICAN BELL TELEPHONE COMPANY, OF SAME PLACE.

AUTOMATIC CIRCUIT-CHANGER.

SPECIFICATION forming part of Letters Patent No. 334,014, dated January 12, 1886.

Application filed October 31, 1885. Serial No. 181,523. (No model.)

*To all whom it may concern:*

Be it known that I, EZRA T. GILLILAND, residing at Boston, in the county of Suffolk and State of Massachusetts, have invented certain Improvements in Automatic Circuit-Changers, of which the following is a specification.

My invention relates to the construction and arrangement of automatic circuit-changers, and to the circuits controlled thereby.

My "village system" of telephone-exchange consists of a series of parallel circuits each and all entering a series of subscribers' stations. The said subscribers have free access to each circuit, a given and predetermined number or portion of the whole being normally located on each of the circuits.

The object of the present invention is to furnish means whereby a distant station, connected with the village system by a single-line wire, may automatically place itself in connection with any circuit of the system. For this purpose I place at one terminal station of the village system an automatic circuit-changer consisting of a motor-driven arm forming the terminal of the electrical circuit extending to the distant station. In this circuit is located an electro-magnet controlling the said motor. The circuits of the village system terminate in spring-fingers, all but one normally resting upon a ground-contact. The circuit-changer, when in its normal or unison position, rests with its arm in contact with the first of the circuits of the village system, which is thereby raised from its ground-contact, the two lines thus forming one compound circuit. Electrical impulses from the distant station release the motor. This rotates the arm, which makes connection with one circuit of the village system after another until the desired circuit is reached. As contact is made between the spring-fingers of any circuit and the moving arm, the arm raises the spring-finger from its ground-contact. The moving arm, while passing from one circuit to another, is disconnected from ground and its circuit is open. By this arrangement an irregular or erratic operation of the transmitting-key produces no confusion. One impulse starts the arm into motion and opens the circuit until connection is made with the next circuit. An indicator at the transmitting-station is of similar construction, and runs synchronously with the circuit-changer, showing the position of the moving arm. After the moving arm passes the last circuit-contact both the circuit changer and indicator run to unison.

Referring to the accompanying drawings, Figure 1 is a complete plan of the arrangement of circuits and the location of the circuit-changer. Fig. 2 is a perspective view of the essential features of the automatic switch or circuit-changer.

At V is shown a plan of my village system, composed of the circuits 1 2 3, &c. A series of stations, S S' S'', &c., are equipped with telephone sets T. Any station has access to any circuit of the system through the medium of switches $s$.

A distant station, C, is equipped with a telephone set, as $t$, and is connected with one terminal station of the village system S by a line-wire, L.

For the purpose of connecting line L with any circuit of the village system, I place at station S a circuit-changer, A. This is illustrated in Fig. 2, and consists of a train of wheels, $w$ W W', driven by any suitable power, as a weight and cord. This train is held at rest by an electro-magnet, M, located in the line L, and controlled by a key, $k$, and battery $b$ at station C. The armature $m$ of magnet M is fixed to a lever, $l$, pivoted upon arbor $d$ and normally resting upon a back stop, $r$.

N is a lever moving freely upon arbor $d$. The wheel $w$ is the last of the train. It has two lugs, $zz$, projecting at diametrically-opposite points of its periphery.

W is a slowly-moving wheel having a series of equidistant notches equal in number to the circuits with which connection is to be made. When a projection, $x$, from lever N falls into one of these notches, the hooked terminal $y$ of lever N takes against one of the lugs $z$ on wheel $w$ and stops the train. Wheel $w$ makes a semi-rotation while wheel W is moving over the space from one notch to another. A single electrical impulse releases the train by attracting armature m, which lifts y out of the path of z, while x rides on the periphery of W. As the train moves one step, an arm, a, forming the terminal of line L, moves along from one spring-finger f to another, passing under a finger, f, (see Fig. 1) and lifting it from the ground, the line L being simultaneously connected with f and the circuit of which it forms the terminal. The indicator I at the transmitting-station is of similar construction, a dial and pointer being substituted for the arm and spring-fingers of the circuit-changer.

After the last notch of wheel W has passed the projection x the projection x rides on the periphery of W, and y cannot engage with z to stop the train until arm a is again at unison, when x drops into the first notch of W, and y again engages with z and stops the train at unison. As the construction of indicator and circuit-changer is similar, unison between the two is thus attainable at any time.

The operation of the system and apparatus is as follows: As line L is normally connected with some one circuit of the village system, any station on that system can communicate with C by switching into such circuit. If C desires to communicate with some station which is normally on another circuit of the village system, he transmits an electrical impulse, which starts the motor-train, arm a advances to and makes contact with the next circuit, when an additional electrical impulse from C further advances arm a, and so on till the required circuit is reached, arm a simultaneously breaking the ground-contact of each line as it makes connection therewith. After the communication is finished arm a is returned to its unison position.

What I claim, and desire to secure by Letters Patent, is—

1. An automatic circuit-changer consisting of a motor-driven arm forming the terminal of an electrical circuit and an electro-magnet located in said circuit for controlling the motor, combined with two or more circuits having their terminals in movable contact-points normally resting on a ground-contact in the path of the moving arm, whereby the said arm in its movement makes connection with and breaks the normal ground-contact of each circuit in succession.

2. The combination, in an automatic circuit-changer, of a movable circuit-terminal controlled by an electro-magnet, and two or more circuits having movable terminals normally connected to ground and located in the path of the first-named terminal, which in its movement simultaneously makes connection with and breaks the ground-contact of each of the last-named circuits in succession.

3. An automatic circuit-changer consisting of the combination of a motor-driven arm forming the terminal of an electrical circuit, an electro-magnet located in said circuit for controlling said motor, and two or more circuits having their terminals in flexible spring-fingers normally resting upon a ground-contact in the path of said arm, which in its movement passes under one spring-finger after another, making an electrical connection and breaking the ground-contact thereof.

4. The combination of two or more main lines and a series of stations equipped with communicating instruments, which may be placed in either main line, a main line extending from one of said stations to a distant point, and an automatic circuit-changer located at said station for connecting the last-named line to any one of the first-named series.

5. The combination of two or more main lines, a series of subscribers' stations equipped with telephones, means whereby the telephone of any station may be inserted in any line of the series, a main line extending from one station of the series to a distant station, and an automatic circuit-changer at the former station for connecting said main line to any other line.

In testimony whereof I have signed my name to this specification, in the presence of two subscribing witnesses, this 28th day of September, 1885.

EZRA T. GILLILAND.

Witnesses:
WM. B. VANSIZE,
GEO. WILLIS PIERCE.